Jan. 8, 1957 N. A. BRANSKE 2,776,535
LAWN EDGER WITH VERTICALLY OSCILLATING BLADE
Filed Jan. 4, 1954
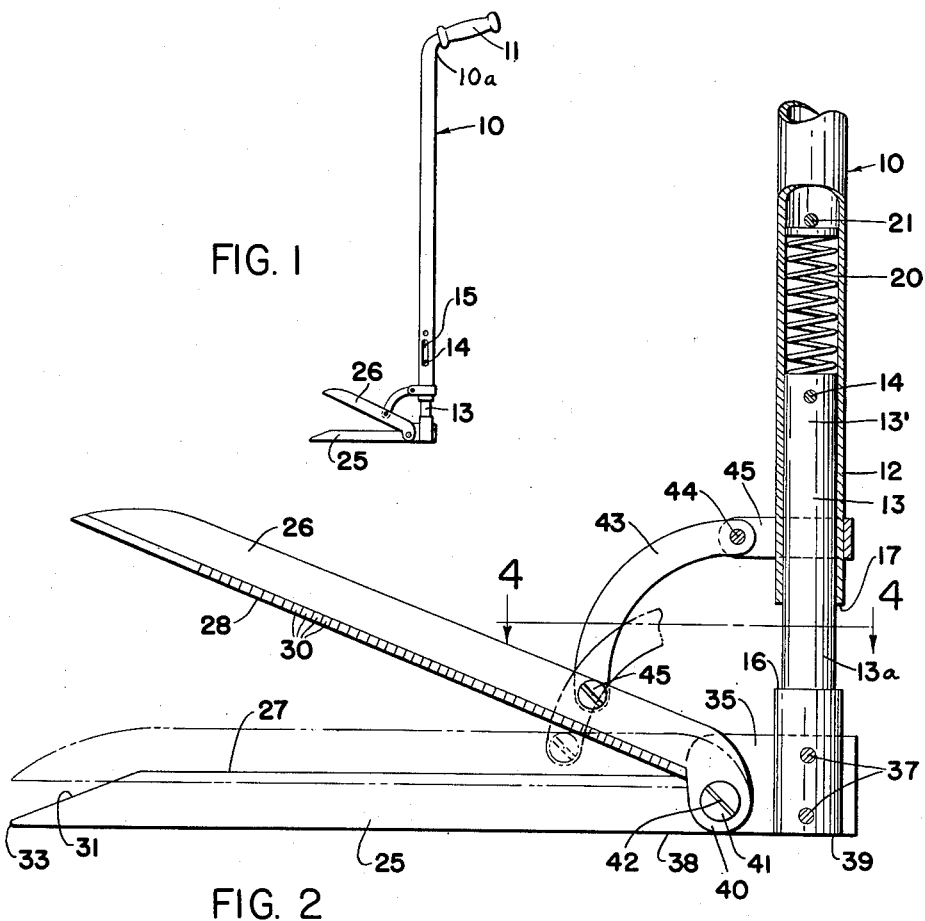
INVENTOR.
NORBERT A. BRANSKE
BY Bosworth Sessions
Herrstrom & Williams
ATTYS.

United States Patent Office 2,776,535
Patented Jan. 8, 1957

2,776,535

LAWN EDGER WITH VERTICALLY OSCILLATING BLADE

Norbert A. Branske, Cleveland, Ohio

Application January 4, 1954, Serial No. 401,911

2 Claims. (Cl. 56—241)

This invention relates to lawn trimming devices and in particular to an edging shears adapted to trim the edge of a lawn adjacent sidewalks and the like.

An object of my invention is the provision of a lawn edger which can be operated conveniently by the user without stooping or squatting. Another object is the provision of an edger with vertically movable shear blades that are actuated by pressure of the handle against the ground thereby permitting continuous edging of an entire lawn with a minimum of fatigue to the operator. Another object is the provision of lawn edging device wherein the vertically disposed shearing blades are connected to the blade actuating mechanism so as to afford a quick snap-like cutting action which results in effective cutting of even heavily matted grass and the like. Another object is the provision of an edging device with cutting blades arranged to scoop under a maximum amount of grass to be trimmed and to prevent the grass from slipping off the blades during the cutting action. Another object is the provision of a vertically actuated lawn edger that is light in weight, compact in size and is extremely economical to manufacture.

These and other objects of my invention will become apparent from the following description of a preferred embodiment thereof reference being had to the accompanying drawing.

Figure 1 is an elevation of the edger in position to cut or edge a lawn.

Figure 2 is an enlarged fragmentary elevation partly in section of the lower portion of the edger showing the details of the operating mechanism.

Figure 3 is a fragmentary end view of the lower portion of the edger showing the connection of the stationary cutting blade to the vertically extending bar.

Figure 4 is a horizontal section taken on the line 4—4 of Figure 2.

Figure 5 is a fragmentary elevation of modified cutting blades.

The lawn edger which embodies my invention includes a tubular handle 10 adapted to extend vertically when the edger is in the operating position, the handle having a bent upper end 10a fitted with a rubber grip 11. The lower end 12 of the handle 10 is open and telescopically receives the upper end 13' of a rigid blade holding bar 13, the lower end 13a of which extends from the handle for contact with and support on the ground when the edger is in position for clipping. The cross-sectional dimensions of bar 13 and handle 10 preferably are such that the bar fits snugly into the handle so that the handle may slide vertically over the bar with a minimum of friction and play, the length of the upper portion 13' of the bar embraced by the handle being sufficient to provide mutual support between the parts and to insure stability in operation.

The upper end 13' of the bar 13 carries a transverse guide pin 14 which preferably extends from one side of the bar through a closely fitting vertically extending slot 15 in the side wall of the tubular handle. Pin 14 prevents relative rotation of the handle and bar and together with slot 15, located in a predetermined position in the handle side wall, maintains the cutting blades 25 and 26 in desired alignment with the grip 11 on the upper end of the handle. The upper limit of vertical movement of the handle 10 relative to bar 13 is determined by the abutment of pin 14 against the bottom of slot 15. The lower end of bar 13 is provided with a shoulder 16 against which bottom edge 17 of the handle is adapted to abut at the lower limit of its movement and hence the vertical spacing between the shoulder 16 and the bottom edge of the tube when pin 14 rests against the bottom of slot 15 defines the length of stroke of the handle 10 relative to bar 13 for actuating the cutting blade.

In order to resiliently urge the handle 10 to its upper limit of movement relative to the bar 13, a coiled spring 20 is disposed within and concentrically of the axis of the lower handle portion 12 above the upper end of bar 13. The spring 20 is confined between the top of bar 13 and a transverse stop pin 21 secured to opposite parts of the handle wall, and is slightly compressed when guide pin 14 is bottomed in slot 15. When the handle is moved down over bar 13 on the cutting stroke, spring 20 compresses and, when the force on the handle is released, returns the handle to the starting position.

The cutting apparatus includes a lower stationary blade 25 and an upper movable blade 26 pivotally secured together and arranged to lie in planes which are generally parallel to the plane containing the grip 11 and the lower portion of the handle 10. These blades may be stamped or otherwise cut from sheet steel or other suitable material, are generally rigid, and are provided with cutting edges 27, 28 in which a plurality of shallow transversely extending longitudinally spaced serrations 29, 30 are formed. These serrations serve to prevent blades of graess and the like from slipping longitudinally along the blade during the cutting operation. Alternatively, the cutting edges of the blades can be formed with a longitudinal wave-like configuration as indicated at 29', 30' in Figure 5 to accomplish the same result. The outer end portion of the stationary blade cutting edge 27 is tapered or beveled as indicated at 31 and terminates in a relatively pointed end 33. This allows the stationary blade 25 to get under and lift the grass up on the cutting edge as the edger is advanced forwardly to make a fresh cut and insures that the lowermost portions of the grass along the edge being trimmed will be clipped.

The heel 35 of the stationary blade 25 preferably is wider than the forward cutting portion thereof and is secured in a central slot 36, see Figure 3, in the bottom of the bar 13 by suitable means such as rivets 37. The bottom edge 38 of blade 25 is flush with the lower edge 39 of the bar, preferably extending from the bar in a direction normal to the axis thereof, and is adapted to rest on the ground for the full length of the blade when the edger is in the proper operating position. Thus the blade 25 is arranged to gain maximum support from the ground during the cutting operation, and further facilitates proper positioning of the handle relative to the ground and generally stabilizes the whole edger while it is being used.

The rear end 40 of the movable blade 26 is pivotally secured at 41 to the heel 35 at a point offset from bar 13. The pivotal axis 42 of blade 26 lies generally in a horizontal plane and blades 25, 26 lie in vertical planes when the edger is in cutting position. In order to translate vertical movement of the handle 10 relative to bar 13 into pivotal motion of blade 26, a preferably curved arm 43 is connected to the handle and blade 26. The upper end of arm 43 is pivotally connected to the tightening screw 44 of a clamp 45 which is securely fastened to the lower end portion 12 of handle 10. Blade 26 is pivotally connected to the lower end of the arm 43 by suitable means at a point 45 spaced from the pivotal connection of blades 25 and 26. Vertical movement of the handle during operation of the shears thus causes arm 43 to pivot blade 26 about its axis 42 and to effect opening and closing of the blades for cutting the grass between them, the closed position being indicated in broken line in Figure 2.

In operation, grip 11 on the upper end of the handle is grasped by the user in standing position with the handle extending down toward the ground and with the lower edge 35 of the stationary blade 25 resting on the surface adjacent the edge of grass to be trimmed. With the blades open as shown in Figures 1 and 2, the whole edger is moved forward in the direction of the blades and approximately the length of the blades to position grass to be cut on the cutting edge of the stationary blade 25.

The user depresses the handle, telescoping same over bar 13 and compressing spring 20, until the bottom edge of the handle engages the shoulder 16 on the bar. This causes the upper cutting blade 26 to pivot downwardly about its axis 42 and sever the grass ends lying on the lower blade. The user then merely releases the force on the handle and spring 20 returns same along with movable blade 26 to the starting position. This cycle is repeated as the edger is progressively advanced along the grass edge until the edging job is finished.

Modifications, changes and improvements to the herein described preferred embodiment of my invention may occur to those skilled in the art without departing from the spirit and scope of my invention. The patent therefore is not to be limited to the embodiment of the invention as illustrated and described. The scope of the patent is summarized in the appended claims.

I claim:

1. A lawn edging device comprising a tubular member having a closed upper end defining a handle and having an open lower end, a blade holding bar telescoped for a limited distance within and extending outwardly from the lower end of said member, a compression spring supported within the lower end of said member and engaging said bar for normally urging the bar outwardly from said member, said member having an elongated straight longitudinally extending slot, a guide pin carried by said bar and extending through said slot whereby to prevent relative rotation of said bar and said member, the portion of said member at one end of said slot defining a stop against which said pin abuts to limit movement of said bar out of said member, a shoulder on said bar normally spaced from the lower end of said member when said guide pin is bottomed in said slot and adapted to engage the lower end of the member for limiting downward movement of the member over the bar, a stationary cutting blade having a heel portion rigidly secured to the lower end of the bar, said blade having a flat bottom edge extending at right angles to the axis of said bar and engageable with the ground for the full length of the blade, said blade also lying substantially in a plane containing the axis of said bar, a movable cutting blade pivotally connected to the heel portion of the stationary blade offset from said bar and arranged to pivot in a plane parallel to the plane of said stationary blade for cutting grass between the blades, and a blade actuating arm connected to the lower end of said member and to said movable blade for causing pivotal movement of said movable blade in response to vertical movement of said member over said bar, the point of connection of said arm to said movable blade being located on the side of the pivotal connection of the blades opposite from said bar.

2. A lawn edging device comprising a vertically disposed tubular member having an upper end and an open lower end, a blade holding bar telescoped snugly and slidably within and extending from the lower end of said member, a compression spring anchored within the lower end of said member above said bar for urging said member to move in one direction relative to said bar, said member having a longitudinally extending slot, a guide pin carried by said bar and extending through said slot whereby to prevent relative rotation of said bar and said member and for limiting movement of said member in said one direction relative to said bar, a shoulder on said bar normally spaced from the lower end of said member when said guide pin is bottomed in said slot and adapted to engage the lower end of the member for limiting movement of the member over the bar in the opposite direction, a stationary cutting blade secured to the lower end of the bar and having a straight lower edge extending at right angles to said bar and adapted to rest on the horizontal supporting surface for the full length of the blade, said blade also having an upper cutting edge with a downwardly tapered leading end portion remote from said bar for raising grass onto said upper edge as the edger is advanced in the direction of said blade, a vertically movable cutting blade pivotally connected to the stationary blade offset from said bar and having a straight lower cutting edge, said cutting edges being adapted to cut grass between the blades when the movable blade is moved downwardly, and an actuating arm connected to the lower end portion of said member and to said movable blade for causing pivotal movement of said movable blade relative to said stationary blade in response to movement of said member over said bar, said arm being connected to said movable blade at a point between the pivotal connection of the blades and the free end of the movable blade.

References Cited in the file of this patent

UNITED STATES PATENTS

| | | |
|---|---|---|
| 890,279 | Hoare | June 9, 1908 |
| 1,590,075 | Brenner | June 22, 1926 |
| 2,251,867 | Collins | Aug. 5, 1941 |
| 2,504,164 | Sundstrand | Apr. 18, 1950 |
| 2,519,175 | Caves | Aug. 15, 1950 |
| 2,569,001 | Herr | Sept. 25, 1951 |

FOREIGN PATENTS

| | | |
|---|---|---|
| 600,900 | Great Britain | Apr. 21, 1948 |